United States Patent
Bufe et al.

(10) Patent No.: US 9,484,033 B2
(45) Date of Patent: Nov. 1, 2016

(54) PROCESSING AND CROSS REFERENCE OF REALTIME NATURAL LANGUAGE DIALOG FOR LIVE ANNOTATIONS

(71) Applicant: International Business Machines Corporation, Armonk, NY (US)

(72) Inventors: John P. Bufe, Somerville, MA (US); Donna K. Byron, Petersham, MA (US); Alexander Pikovsky, Lexington, MA (US); Timothy Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/566,900

(22) Filed: Dec. 11, 2014

(65) Prior Publication Data

US 2016/0171983 A1 Jun. 16, 2016

(51) Int. Cl.
*G10L 15/00* (2013.01)
*G10L 15/26* (2006.01)

(52) U.S. Cl.
CPC ..................................... *G10L 15/26* (2013.01)

(58) Field of Classification Search
None
See application file for complete search history.

(56) References Cited

U.S. PATENT DOCUMENTS

| | | | |
|---|---|---|---|
| 5,708,825 A | 1/1998 | Sotomayor | |
| 8,626,491 B2 | 1/2014 | Gattani et al. | |
| 2002/0055913 A1* | 5/2002 | Rajan | G10L 21/028 706/19 |
| 2004/0236830 A1* | 11/2004 | Nelson | H04L 29/06027 709/204 |
| 2005/0235031 A1 | 10/2005 | Schneider et al. | |
| 2006/0047500 A1* | 3/2006 | Humphreys | G06F 17/278 704/9 |
| 2006/0059133 A1* | 3/2006 | Moritani | G06F 17/30887 |
| 2007/0106747 A1* | 5/2007 | Singh | G06F 17/30663 709/217 |
| 2007/0129942 A1* | 6/2007 | Ban | G06F 17/241 704/235 |
| 2007/0133437 A1* | 6/2007 | Wengrovitz | H04M 3/56 370/260 |
| 2009/0235150 A1* | 9/2009 | Berry | G06F 17/30038 715/205 |
| 2009/0306981 A1* | 12/2009 | Cromack | G06F 17/30743 704/235 |
| 2010/0036929 A1* | 2/2010 | Scherpa | G06Q 10/10 709/207 |
| 2011/0054901 A1* | 3/2011 | Qin | G06F 17/2827 704/254 |
| 2011/0069230 A1* | 3/2011 | Polumbus | G06F 17/30746 348/468 |

(Continued)

OTHER PUBLICATIONS

Cerbbah, "Constraining the use of general lexical resources for automatic hyperlink generation," Proceedings of the 20th International conference on Computational Linguistics, Association for Computational Linguistics, Geneva, Switzerland, Aug. 2004, 7 pages.

(Continued)

*Primary Examiner* — Richemond Dorvil
*Assistant Examiner* — Thuykhanh Le
(74) *Attorney, Agent, or Firm* — VanLeeuwen & VanLeeuwen; Diana R. Gerhardt

(57) ABSTRACT

An approach is provided to receive audible speech and convert the received speech to text while the audible speech is being delivered to a user. An annotation candidate is identified in the text and an annotation reference relating to the identified annotation candidate is retrieved and presented to the user.

20 Claims, 6 Drawing Sheets

(56) References Cited

U.S. PATENT DOCUMENTS

| | | | | |
|---|---|---|---|---|
| 2011/0225013 | A1* | 9/2011 | Chavez | G06Q 10/10 705/7.18 |
| 2011/0288866 | A1* | 11/2011 | Rasmussen | H04L 12/1831 704/246 |
| 2012/0143605 | A1* | 6/2012 | Thorsen | G10L 15/183 704/235 |
| 2012/0197862 | A1* | 8/2012 | Woytowitz | G06F 17/30731 707/710 |
| 2012/0201362 | A1* | 8/2012 | Crossan | G10L 15/26 379/88.01 |
| 2012/0203551 | A1* | 8/2012 | Lakshmanan | G06Q 10/109 704/235 |
| 2012/0323575 | A1* | 12/2012 | Gibbon | G11B 27/28 704/246 |
| 2012/0323579 | A1* | 12/2012 | Gibbon | G10L 15/1822 704/270 |
| 2013/0144603 | A1* | 6/2013 | Lord | H04L 12/1831 704/9 |
| 2013/0311177 | A1* | 11/2013 | Bastide | H04N 7/15 704/235 |
| 2014/0006491 | A1* | 1/2014 | Hammer | G06Q 10/101 709/204 |

OTHER PUBLICATIONS

Verborgh et al., "Semantic Technologies as Enabler for Distributed Adaptive Hyperlink Generation," Proceedings of the 21st Conference on User Modeling, Adaptation and Personalization, Rome, Italy, Jun. 2013, 6 pages.

Robert-Ribes et al., "Automatic generation of hyperlinks between audio and transcript." 5th European Conference on Speech Communication and Technology, Rhodes, Greece, Sep. 1997, pp. 903-906.

Budenske et al, "A science and technology literacy browser," 2000 IEEE International Conference on Systems, Man, and Cybernetics, Nashville, TN, Oct. 2000, pp. 695-700.

Guillaume et al., "Exploiting speech for automatic TV delinearization: From streams to cross-media semantic navigation," EURASIP Journal on Image and Video Processing, vol. 2011, Article ID 689780, Jan. 2011, 17 pages.

\* cited by examiner

PROCESSING AND CROSS REFERENCE OF REALTIME NATURAL LANGUAGE DIALOG FOR LIVE ANNOTATIONS

BACKGROUND

In a live forum such as a conference or panel discussion, speakers may make reference to publications, laws, and other outside material that is not readily available. A listener may want more information regarding the item cited. Today the user would have to manually make note of what was said and return to it later, or at best be searching on the internet for it while also trying to follow the rest of the discussion. This is a clumsy solution that splits the listener's attention, increasing the likelihood that they miss something important, write down the wrong thing, or forget to follow up on it later.

BRIEF SUMMARY

According to one embodiment of the present disclosure, an approach is provided to receive audible speech and convert the received speech to text while the audible speech is being delivered to a user. An annotation candidate is identified in the text and an annotation reference relating to the identified annotation candidate is retrieved and presented to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
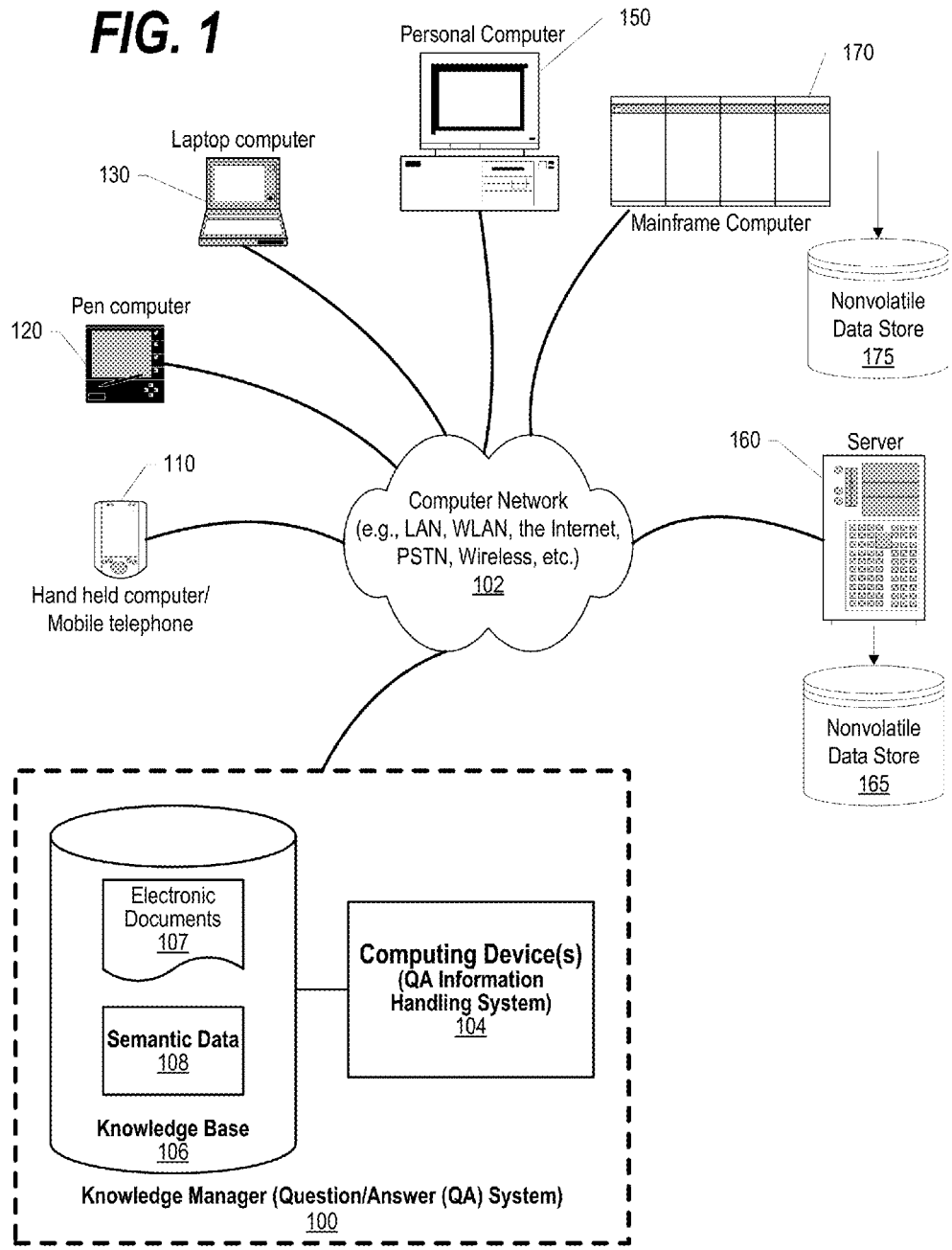
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
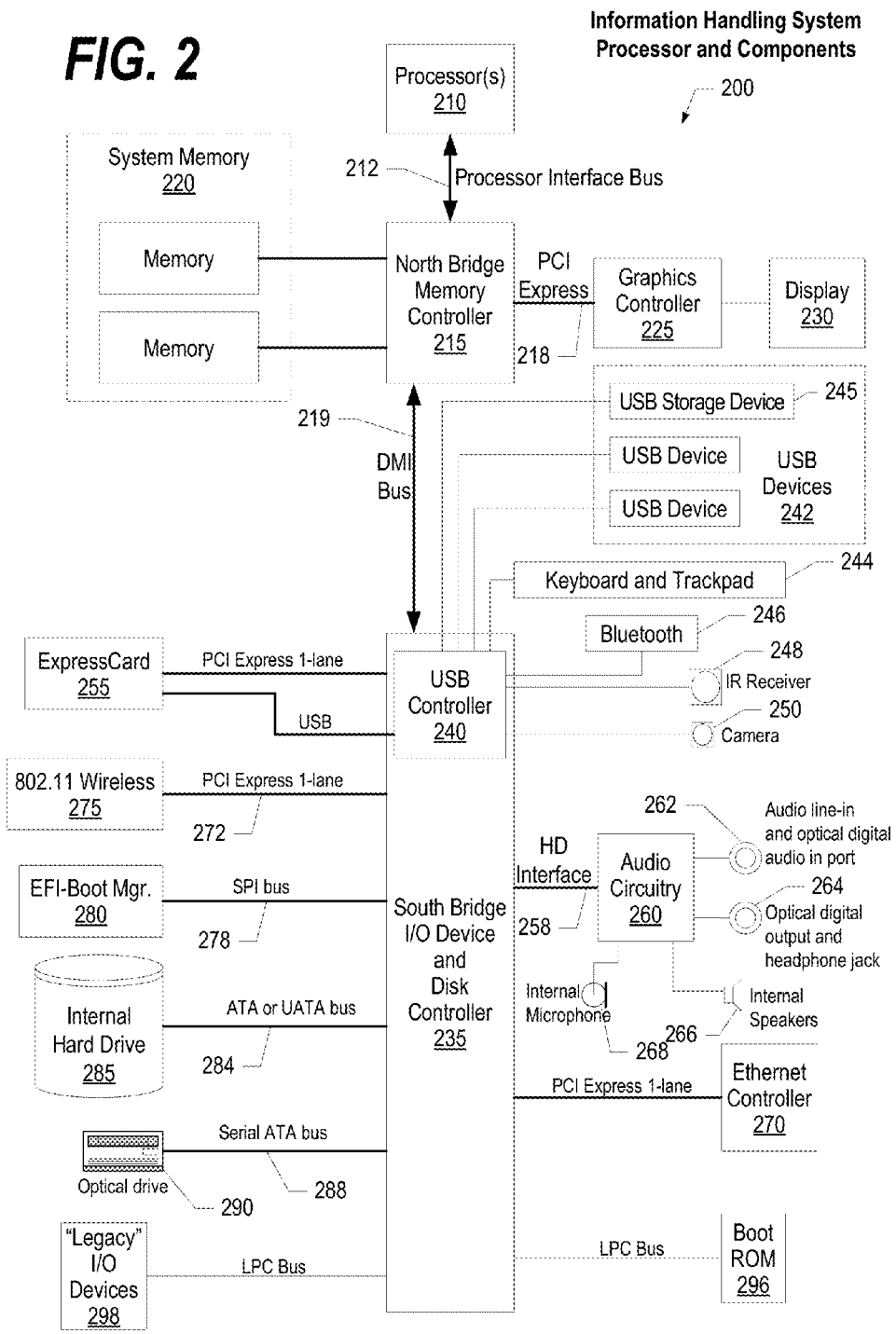
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-6 depict an approach that analyzes a verbal presentation, such as a speech, in real time for references to outside assets. A search is then done in realtime for the asset in question and a link to that asset is returned in an unobtrusive way to the listener who can then follow up on it at their leisure. The system is comprised of the following pieces: (1) a method for speech recognition; (2) a method of natural language analysis that identifies references to outside assets (legal documents, court cases, publications, or other media); (3) a method of retrieving a link to the asset; and (4) a method of presenting that link in an unobtrusive way to the entire audience.

The system uses some method of speech recognition and translates it into a string of text. The system then parses each string of text looking for parts of speech that represent known entities that can be found through searching. Known entities can be defined using several methods including, but not limited to, any of the following: (1) Regular Expression (regex) matching; (2) Lexical Types; and (3) Parts of Speech. Examples of entities the system could look for include references to law documents, court cases, published works and other media.

When an entity is identified, the system then retrieves a link to the referenced item. For example when a law is referenced, A link to the content of the section of law referenced will be retrieved. The link can point to a locally stored resource, a remote resource such as a URL, or any other type of resource available to the system. That link is then presented to the user in a way which is unobtrusive to the user, so as not to distract their attention from the live event, but that the user will acknowledge and understand is relevant to something that was just said. For example the system may provide an electronic alert that shows the reference quoted along with a link or icon that the user recognizes as a link.

By way of an example, during the presidential debates of 2012, candidate Mitt Romney stated "Russia's said they're not going to follow Nunn-Lugar anymore; they'll back away from their nuclear proliferation treaty that we had with them." Here, the system could identify the term "Nunn-Lugar" as a searchable entity, search the term "Nunn-Lugar," and return a hyperlink to the user that, when selected by the user such as using a smart phone, retrieves information related to the Nunn-Lugar nuclear proliferation treaty.

The approach presented herein can use several methods to identify references to an outside asset. One example could be a combination of metrics based on the following factors: (1) Rarity of the word in the corpus ("Nunn-Lugar") The word Nunn-Lugar would be a known word in a corpus based on an online encyclopedia, but would be relatively rare; (2) Phrase matches such as "Smith versus Maryland." Simple regex matching of phrases from the dialog that are known to be references, for example a court case. (3) Contextual hints (e.g., "according to section 215 of . . . ", etc.). Phrases like "according to" or "as seen in" are a clue that the subject is a reference, especially when combined with regex phrase matching.

After identifying the reference, the system can use filters to determine whether to actually retrieve data pertaining to the reference based on a number of criteria. First, "Commonality" can be used as a filter (e.g., "1st Amendment," etc.). If the reference refers to something commonly known by the public, the system may choose to filter it out. For example most people know what the 1st Amendment refers to, and would not need additional explanation. What counts as common could be based on something like rarity in the corpus as mentioned above, or commonality could be learned by the system over time. Second, Quantity, signal vs. noise could be used as a filter. The threshold could be variable so as to not allow more than a particular number ("x") references to be presented in a given amount of time.

Figure 3:
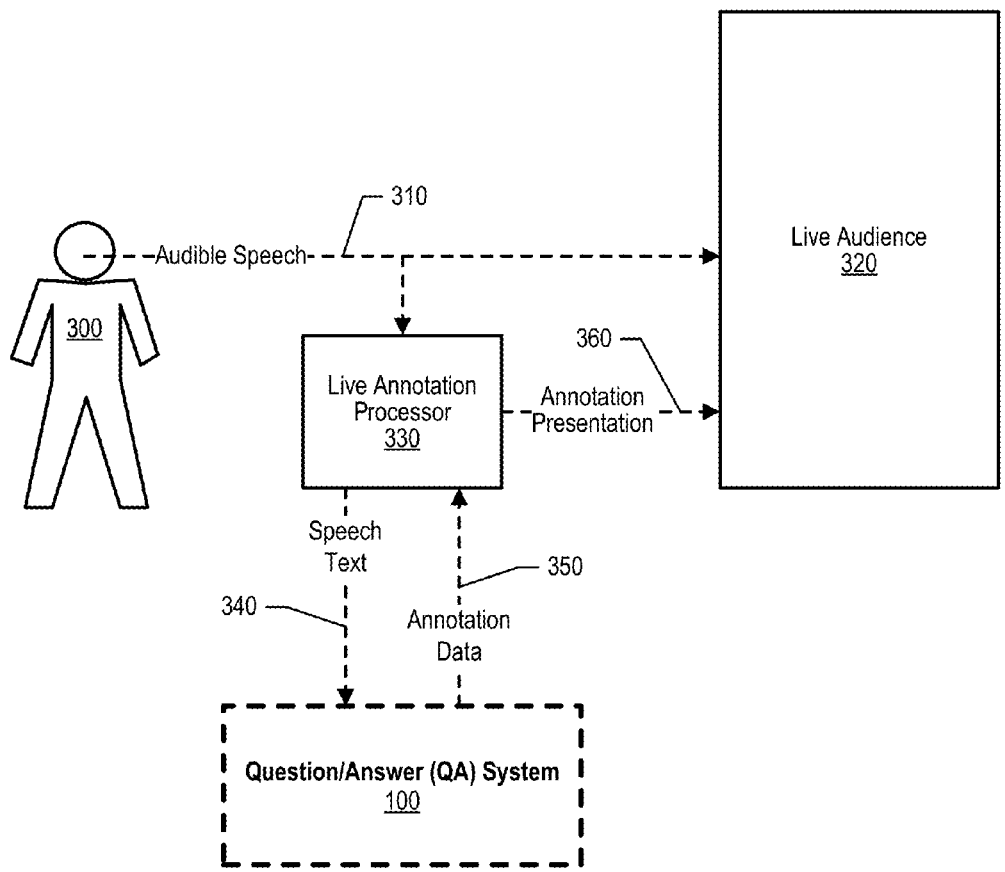
FIG. 3 is an exemplary diagram depicting the system that processes and cross references of realtime natural language dialog for live annotations.

FIG. 3 is an exemplary diagram depicting the system that processes and cross references of realtime natural language dialog for live annotations. Speaker 300 is delivering audible speech 310 to a live audience 320. Users of the system are members of the live audience. The live audience may be at the same venue as speaker 300 or may be receiving the audible speech live via a radio broadcast, television broadcast, web broadcast, or other multimedia type delivery system.

Live annotation processor 330 converts the audible speech to speech text and identifies annotation candidates using the speech text. In one embodiment, the identification of annotation candidates is performed using QA system 100. Annotation data 350 includes annotation references that are presented to users included in live audience 320 via annotation presentation 360. Annotation presentation 360 may be a link to the annotation reference or may be descriptive text pertaining to the annotation candidate. For example, if speaker 300 refers to an uncommon or otherwise obscure term, the live annotation processor would identify that the term is uncommon, identify annotation data referring to the term, and present the annotation data, such as a link or a descriptive text, to users included in live audience 320.

Figure 4:
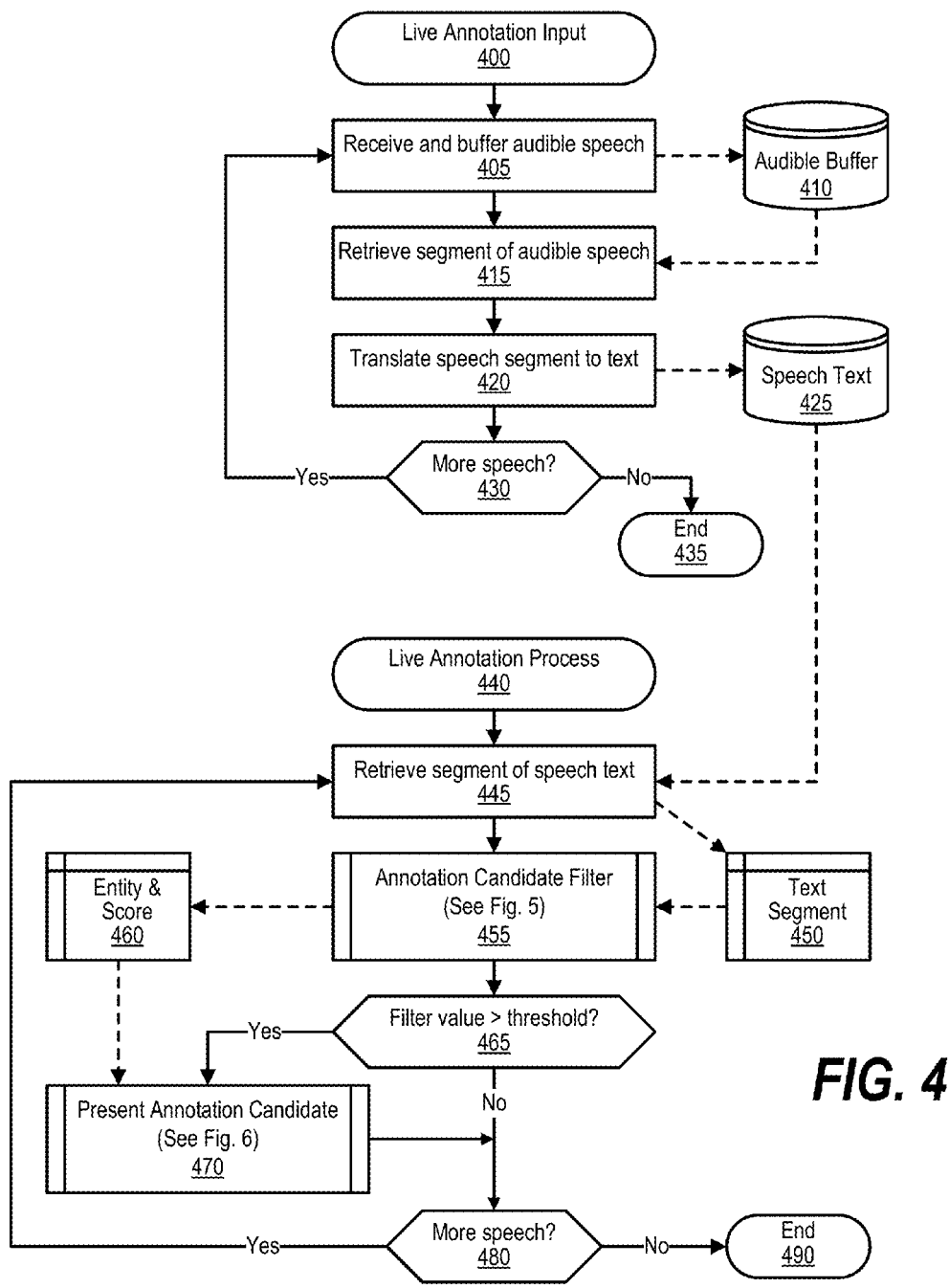
FIG. 4 is an exemplary set of flowcharts to process live annotation inputs.

FIG. 4 is an exemplary set of flowcharts to process live annotation inputs. FIG. 4 processing commences at 400 and shows the steps taken by a process that performs a routine that processes live annotation input. At step 405, the process receives and buffers audible speech that is being delivered by a speaker. The buffered speech is stored in data store 410. At step 415, the process retrieves a segment of audible speech from data store 410. At step 420, the process translates the speech segment to text and stores the text in data store 425. The process determines as to whether there is more speech to process (decision 430). If there is more speech to process, then decision 430 branches to the 'yes' branch which loops back to receive and process the next audible speech from the speaker. This looping continues until there is no more speech to process, at which point decision 430 branches to the 'no' branch and live annotation input processing ends at 435.

Concurrent with the live annotation input process, the live annotation process processes the speech text to identify annotation candidates and annotation references that are delivered to users. The live annotation process commences at 400 whereupon, at step 445, the process retrieves the first segment of speech text from data store 425. The retrieved text segment (e.g., sentence, phrase, etc.) is stored in memory area 450. At predefined process 455, the process performs the Annotation Candidate Filter routine (see FIG. 5 and corresponding text for processing details). Predefined process 455 processes the text segment stored in memory area 450 and identifies annotation candidates and scores pertaining to such candidates. The process determines as to whether the annotation candidate score exceeds a given threshold (decision 465). If the annotation candidate score exceeds the threshold, then decision 465 branches to the 'yes' branch whereupon, at predefined process 470, the process performs the Present Annotation Candidate routine (see FIG. 6 and corresponding text for processing details).

On the other hand, if the annotation candidate score does not exceed the threshold, then decision 465 branches to the 'no' branch bypassing predefined process 470. The process determines as to whether there is more speech text to process (decision 480). If there is more speech text to process, then decision 480 branches to the 'yes' branch which loops back to step 445 to retrieve and process the next segment of speech text as described above. This looping continues until there is more speech text to process, at which point decision 480 branches to the 'no' branch and processing ends at 490.

Figure 5:
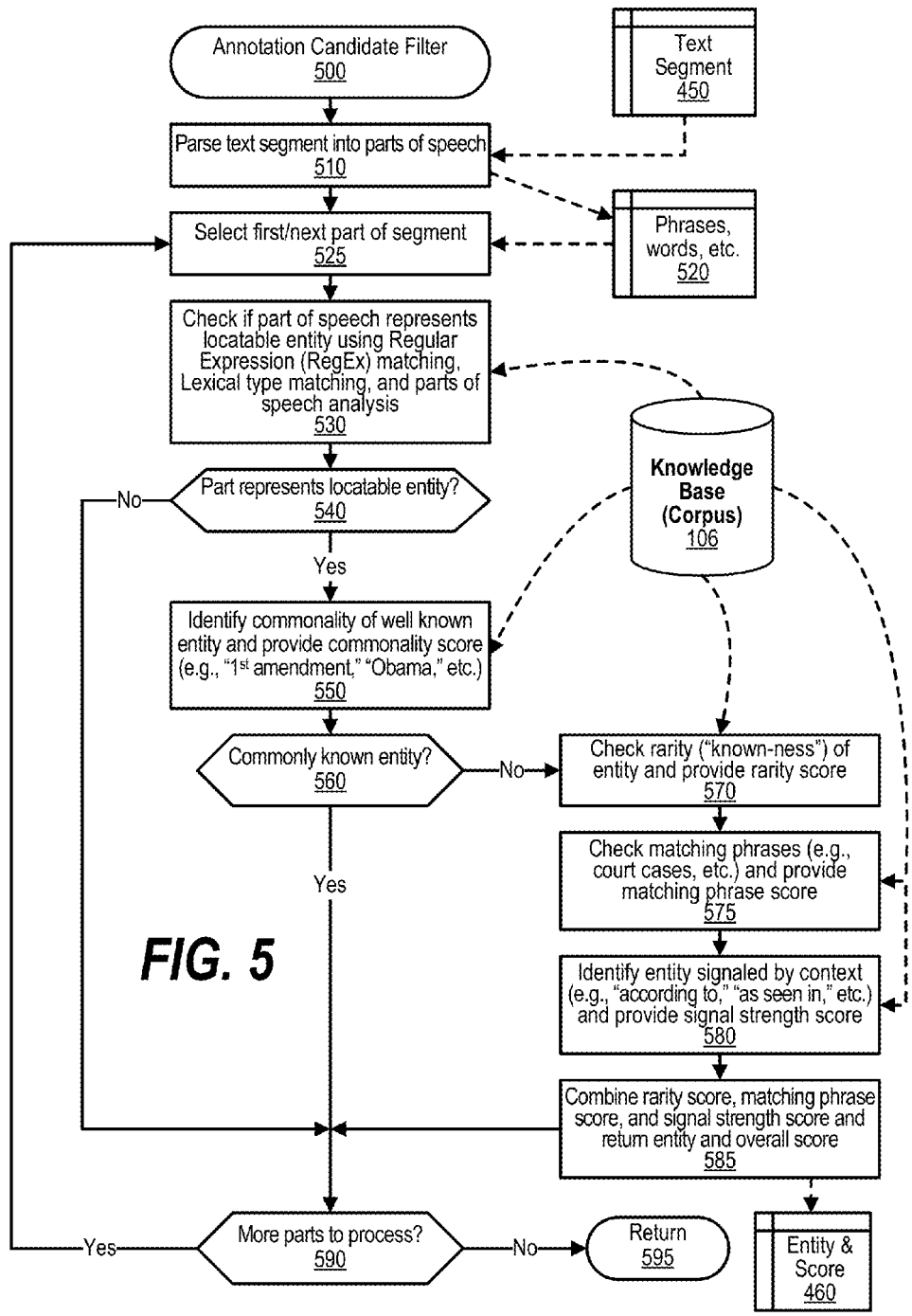
FIG. 5 is an exemplary flowchart that filters live annotation candidates.

FIG. 5 is an exemplary flowchart that filters live annotation candidates. FIG. 5 processing commences at 500 and shows the steps taken by a process that performs a routine that filters annotation candidates. At step 510, the process retrieves the text segment from memory area 450 and parses the text segment into parts of speech such as objects, nouns, verbs, subjects, and the like. These parts of speech are stored in memory area 520. At step 525, the process selects the first part of the segment from memory area 520.

At step 530, the process checks if the selected part of speech represents a locatable entity using Regular Expression (RegEx) matching, Lexical type matching, and parts of speech analysis. This check can be facilitated using corpus 106 included in a question answering (QA) system. The process determines as to whether the selected part represents a locatable entity (decision 540). If the selected part represents a locatable entity, then decision 540 branches to the 'yes' branch for further processing. On the other hand, if the selected part does not represent a locatable entity, then decision 540 branches to the 'no' branch bypassing the remaining steps.

At step 550, the process identifies the commonality of the entity and provide commonality score (e.g., "1st amendment," "Obama," etc.). The process determines as to whether the entity is a commonly known entity (decision 560). Data pertaining to commonly known entities is not particularly useful to augment the user with additional data during the live presentation. Therefore, if the entity is commonly known, then decision 560 branches to the 'yes' branch bypassing the remaining steps. On the other hand, if the entity is not commonly known, then decision 560 branches to the 'no' branch to perform steps 570 through 585.

At step 570, the process checks the rarity, or "knownness," of the entity and computes a rarity score. Entities that are rare receive a higher score than entities that are not rare. At step 575, the process checks for matching phrases that indicate that the entity is an interesting term (e.g., court cases, etc.) and the process computes a matching phrase score. Terms that relate to a matching phrase such as "a landmark decision," "court case," "ruling," etc. receive a higher matching phrase score than terms that are not part of a matching phrase. At step 580, the process identifies whether the entity is signaled by a particular context (e.g., "according to," "as seen in," etc.) and the process computes a signal strength score. An entity signaled by a particular context receives a higher signal strength score than an entity that is not signaled by a particular context. At step 585, the process combines the rarity score, the matching phrase score, and the signal strength score and returns the entity and its overall score in memory area 460.

The process determines as to whether there are more parts to process (decision 590). If there are more parts to process, then decision 590 branches to the 'yes' branch which loops back to select and process the next part of the text segment as described above. This looping continues until there are no more parts to process from text segment 450, at which point decision 590 branches to the 'no' branch and processing returns to the calling routine (see FIG. 4) at 595. Any identified entities (annotation candidates) and their respective scores are returned to the calling routine via memory area 460.

Figure 6:
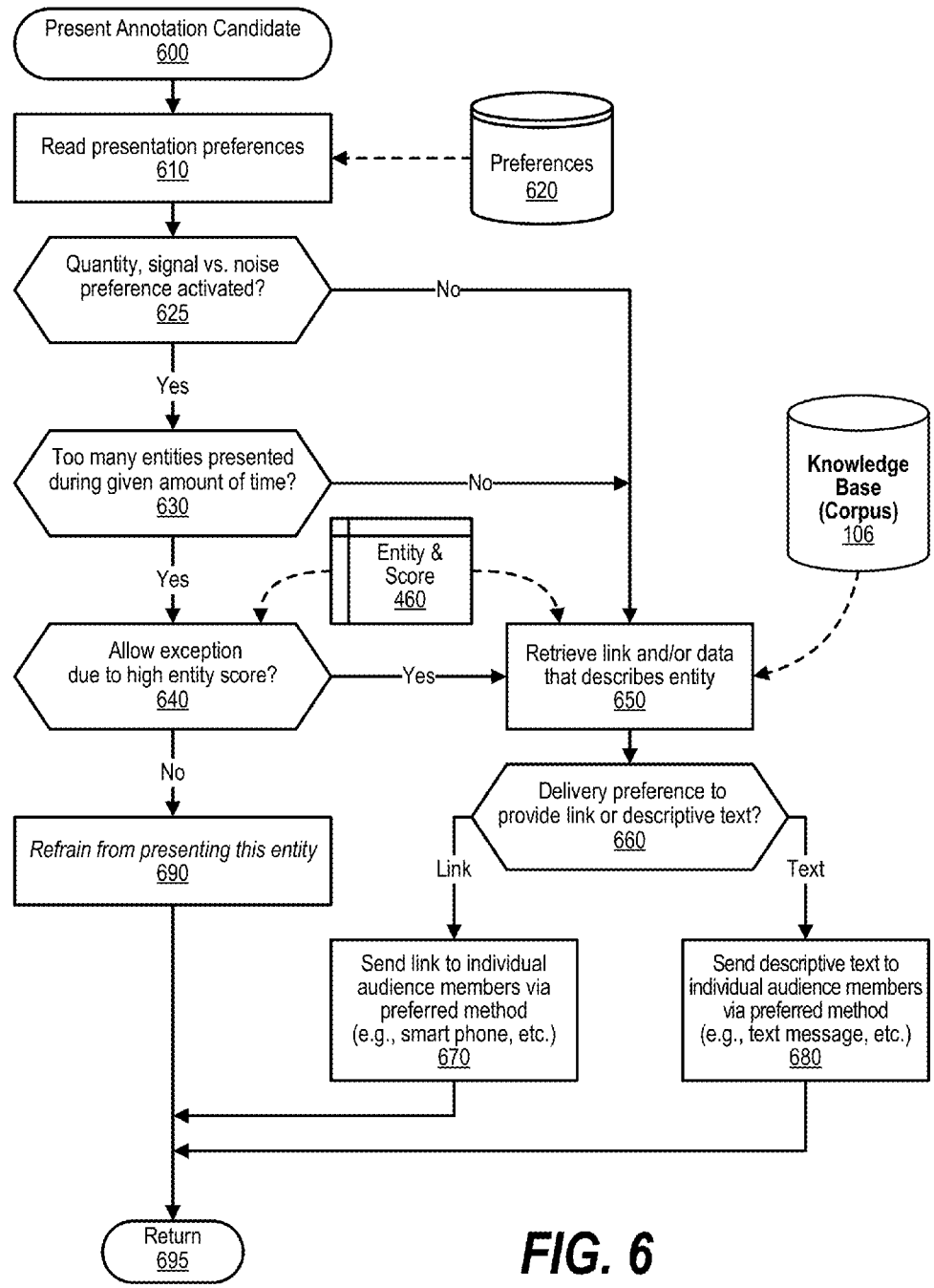
FIG. 6 is an exemplary flowchart that presents a live annotation candidate to users.

FIG. 6 is an exemplary flowchart that presents a live annotation candidate to users. FIG. 6 processing commences at 600 and shows the steps taken by a process that performs a routine that presents an annotation candidate to the user. At step 610, the process reads the user's presentation preferences from data store 620. The process determines as to whether a quantity, signal vs. noise preference has been activated based on the user's preferences (decision 625). If the quantity, signal vs. noise preference has been activated, then decision 625 branches to the 'yes' branch to process the preference. On the other hand, this preference has not been activated, then decision 625 branches to the 'no' branch bypassing decisions 630 and 640.

If the preference is activated, the process determines as to whether too many entities have been presented during given amount of time (decision 630). If too many entities have been presented during given amount of time, then decision 630 branches to the 'yes' branch for exception checking. On the other hand, too many entities have not been presented during given amount of time, then decision 630 branches to the 'no' branch bypassing decision 640.

The process determines as to whether to allow this annotation candidate as an exception due to a high entity score (decision 640). If the determination is to allow this annotation candidate as an exception due to a high entity score, then decision 640 branches to the 'yes' branch to present the annotation candidate. On the other hand, if the determination is not to allow this annotation candidate as an exception due to a high entity score, then decision 640 branches to the 'no' branch whereupon, at step 690, the system refrains from presenting the annotation candidate to the user.

If the quantity, signal vs. noise preference is not activated (with decision 625 branching to the 'no' branch), or there have not been too many entities presented during a given period of time (with decision 630 branching to the 'no' branch), or the annotation candidate is being allowed for presentation due to a high entity score (with decision 640 branching to the 'yes' branch), then, at step 650, the process retrieves the annotation reference (link and/or data) that describes the annotation candidate. The process determines as to whether the user's delivery preference is to provide a link (e.g., hyperlink, etc.) or to provide descriptive text to the user (decision 660). If the delivery preference is to provide a link, then decision 660 branches to the 'link' branch whereupon, at step 670 the process sends link to individual audience members (users) via the individual users' preferred methods (e.g., smart phone, etc.). On the other hand, if the delivery preference is to provide descriptive text, then decision 660 branches to the 'text' branch whereupon, at step 680 the process sends descriptive text to the individual audience members (users) via the individual users' preferred methods (e.g., text message, etc.). FIG. 6 processing thereafter returns to the calling routine (see FIG. 4) at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    converting audible speech received by a microphone to text, wherein the audible speech is being delivered to a user;
    identifying an annotation candidate included in the text;
    combining a rarity score pertaining to the identified annotation candidate, a phrase matching score pertaining to the identified annotation candidate, and a signal strength score pertaining to a context of the identified annotation candidate into an overall score;
    in response to the overall score exceeding a threshold, retrieving an annotation reference relating to the identified annotation candidate; and
    presenting the annotation reference to the user.

2. The method of claim 1 wherein the annotation reference is presented to the user while the audible speech is still being delivered.

3. The method of claim 1 further comprising:
    parsing the text into a plurality of parts;
    identifying a locatable entity as one of the parts; and
    filtering the locatable entity, wherein the filtering results in the annotation candidate.

4. The method of claim 3 wherein the filtering further comprises:
    identifying that the locatable entity is an uncommon entity.

5. The method of claim 4 further comprising:
    generating the rarity score pertaining to the uncommon entity;
    generating the phrase matching score pertaining to the uncommon entity; and
    generating the signal strength score pertaining to a context of the uncommon entity.

6. The method of claim 1 further comprising:
    determining whether to present the annotation reference based on a number of a plurality of annotation references previously presented to the user in a given amount of time;
    presenting the annotation reference in response to the number of the plurality of annotation references not exceeding a threshold; and
    refraining from presenting the annotation reference in response to the number of the plurality of annotation references exceeding the threshold.

7. The method of claim 1 further comprising:
    retrieving a delivery preference pertaining to the user, wherein the delivery preference is selected from the group consisting of a link and a text;
    presenting an annotation link to the annotation reference in response to the delivery preference being the link; and
    presenting a descriptive text of the annotation reference in response to the delivery preference being the text.

8. An information handling system comprising:
    one or more processors;
    one or more data stores accessible by at least one of the processors;
    a microphone;
    a memory coupled to at least one of the processors; and a set of computer program instructions stored in the memory and executed by at least one of the processors in order to perform actions of:
  converting audible speech received by the microphone to text, wherein the audible speech is being delivered to a user;
  identifying an annotation candidate included in the text;
  combining a rarity score pertaining to the identified annotation candidate, a phrase matching score pertaining to the identified annotation candidate, and a signal strength score pertaining to a context of the identified annotation candidate into an overall score;
  in response to the overall score exceeding a threshold, retrieving an annotation reference relating to the identified annotation candidate; and
  presenting the annotation reference to the user.

9. The information handling system of claim 8 wherein the annotation reference is presented to the user while the audible speech is still being delivered.

10. The information handling system of claim 8 wherein the actions further comprise:
  parsing the text into a plurality of parts;
  identifying a locatable entity as one of the parts; and
  filtering the locatable entity, wherein the filtering results in the annotation candidate.

11. The information handling system of claim 10 wherein the filtering further comprises:
  identifying that the locatable entity is an uncommon entity.

12. The information handling system of claim 11 wherein the actions further comprise:
  generating the rarity score pertaining to the uncommon entity;
  generating the phrase matching score pertaining to the uncommon entity; and
  generating the signal strength score pertaining to a context of the uncommon entity.

13. The information handling system of claim 8 wherein the actions further comprise:
  determining whether to present the annotation reference based on a number of a plurality of annotation references previously presented to the user in a given amount of time;
  presenting the annotation reference in response to the number of the plurality of annotation references not exceeding a threshold; and
  refraining from presenting the annotation reference in response to the number of the plurality of annotation references exceeding the threshold.

14. The information handling system of claim 8 wherein the actions further comprise:
  retrieving a delivery preference pertaining to the user, wherein the delivery preference is selected from the group consisting of a link and a text;
  presenting an annotation link to the annotation reference in response to the delivery preference being the link; and
  presenting a descriptive text of the annotation reference in response to the delivery preference being the text.

15. A computer program product stored in a non-transitory computer readable storage medium, comprising computer program code that, when executed by an information handling system, causes the information handling system to perform actions comprising:
  converting audible speech received by a microphone to text, wherein the audible speech is being delivered to a user;
  identifying an annotation candidate included in the text;
  combining a rarity score pertaining to the identified annotation candidate, a phrase matching score pertaining to the identified annotation candidate, and a signal strength score pertaining to a context of the identified annotation candidate into an overall score;
  in response to the overall score exceeding a threshold, retrieving an annotation reference relating to the identified annotation candidate; and
  presenting the annotation reference to the user.

16. The computer program product of claim 15 wherein the annotation reference is presented to the user while the audible speech is still being delivered.

17. The computer program product of claim 15 wherein the actions further comprise:
  parsing the text into a plurality of parts;
  identifying a locatable entity as one of the parts; and
  filtering the locatable entity, wherein the filtering results in the annotation candidate.

18. The computer program product of claim 17 wherein the filtering further comprises:
  identifying that the locatable entity is an uncommon entity.

19. The computer program product of claim 18 wherein the actions further comprise:
  generating the rarity score pertaining to the uncommon entity;
  generating the phrase matching score pertaining to the uncommon entity; and
  generating the signal strength score pertaining to a context of the uncommon entity.

20. The computer program product of claim 15 wherein the actions further comprise:
  determining whether to present the annotation reference based on a number of a plurality of annotation references previously presented to the user in a given amount of time;
  presenting the annotation reference in response to the number of the plurality of annotation references not exceeding a threshold; and
  refraining from presenting the annotation reference in response to the number of the plurality of annotation references exceeding the threshold.

* * * * *